(12) United States Patent
Yang et al.

(10) Patent No.: US 11,336,389 B2
(45) Date of Patent: May 17, 2022

(54) TRANSMITTING DEVICE WHICH GENERATES A PHYSICAL LAYER PACKET BY INSERTING PADDING AND TRANSMITTING METHOD THEREOF

(71) Applicant: Samsung Electronics Co., Ltd., Suwon-si (KR)

(72) Inventors: Hyun-koo Yang, Seoul (KR); Young-ho Oh, Suwon-si (KR); Hak-ju Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/981,914

(22) PCT Filed: Jun. 4, 2018

(86) PCT No.: PCT/KR2018/006350
§ 371 (c)(1),
(2) Date: Sep. 17, 2020

(87) PCT Pub. No.: WO2019/198873
PCT Pub. Date: Oct. 17, 2019

(65) Prior Publication Data
US 2021/0119725 A1    Apr. 22, 2021

(30) Foreign Application Priority Data

Apr. 13, 2018 (KR) .......................... 10-2018-0043310

(51) Int. Cl.
*H04L 1/00* (2006.01)
*H04L 5/00* (2006.01)

(52) U.S. Cl.
CPC .......... *H04L 1/0008* (2013.01); *H04L 5/0044* (2013.01)

(58) Field of Classification Search
None
See application file for complete search history.

(56) References Cited

U.S. PATENT DOCUMENTS 6,522,651 B2    2/2003   Herrmann
8,489,758 B2    7/2013   Astrom et al.
(Continued)

FOREIGN PATENT DOCUMENTS

JP      2009-212919 A     9/2009
KR   10-2012-0108920 A   10/2012
(Continued)

OTHER PUBLICATIONS

Korean Office Action with English translation dated Sep. 24, 2021; Korean Appln. No. 10-2018-0043310.

*Primary Examiner* — Diane L Lo
(74) *Attorney, Agent, or Firm* — Jefferson IP Law, LLP

(57) ABSTRACT

A transmission device is disclosed. The transmitting device comprises a processor for generating a packet comprising a header and a payload, on the basis of an input packet, and generating a frame comprising the generated packet, and a transmission unit for transmitting a signal generated on the basis of the frame. The processor inserts padding into at least one packet from among a plurality of packets included in the frame, on the basis of the number of packets included in the frame, the length of each input packet included in the frame, and the lengths of the packets. Here, the boundary of an input packet may be included in a packet into which padding is inserted.

13 Claims, 15 Drawing Sheets

(56) References Cited

U.S. PATENT DOCUMENTS

| | | |
|---|---|---|
| 8,976,902 B2 | 3/2015 | Jeong et al. |
| 9,225,357 B2 | 12/2015 | Myung et al. |
| 9,806,853 B2 | 10/2017 | Jeong et al. |
| 10,050,741 B2 | 8/2018 | Jeong et al. |
| 10,193,803 B2 | 1/2019 | Hwang et al. |
| 10,616,107 B2 | 4/2020 | Hwang et al. |
| 2004/0151182 A1 | 8/2004 | Kokubo et al. |
| 2008/0124051 A1 | 5/2008 | Yen |
| 2010/0146351 A1 | 6/2010 | Kakani et al. |
| 2012/0243600 A1 | 9/2012 | Jeong et al. |
| 2015/0180612 A1 | 6/2015 | Jeong et al. |
| 2015/0264407 A1 | 9/2015 | Liu et al. |
| 2016/0134532 A1 | 5/2016 | Hwang et al. |
| 2017/0187849 A1 | 6/2017 | Mourad et al. |
| 2018/0006860 A1* | 1/2018 | Zhang ................. H04L 27/2602 |
| 2018/0041307 A1 | 2/2018 | Jeong et al. |
| 2019/0068324 A1* | 2/2019 | Taniguchi ............. H04L 1/0058 |
| 2019/0140946 A1 | 5/2019 | Hwang et al. |
| 2020/0204491 A1 | 6/2020 | Hwang et al. |

FOREIGN PATENT DOCUMENTS

| | | |
|---|---|---|
| KR | 10-2013-0095231 A | 8/2013 |
| KR | 10-2016-0056302 A | 5/2016 |
| WO | 2017/004491 A1 | 1/2017 |

\* cited by examiner

TRANSMITTING DEVICE WHICH GENERATES A PHYSICAL LAYER PACKET BY INSERTING PADDING AND TRANSMITTING METHOD THEREOF

CROSS-REFERENCE TO RELATED APPLICATION(S)

This application is a U.S. National Stage application under 35 U.S.C. § 371 of an International application number PCT/KR2018/006350, filed on Jun. 4, 2018, which is based on and claims priority of a Korean patent application number 10-2018-0043310, filed on Apr. 13, 2018, in the Korean Intellectual Property Office, the disclosure of each of which is incorporated by reference herein in its entirety.

TECHNICAL FIELD

The disclosure relates to a transmitting device and a transmitting method thereof, and more particularly, to a transmitting device which generates a physical layer packet by inserting padding, and a transmitting method thereof.

BACKGROUND ART

In the information society of the 21st century, broadcasting communication services are coping with the age of full-out digitalization, multi-channelization, broad-banding, and higher quality. In particular, as supply of high definition digital TVs and PMPs, and portable broadcasting devices has been expanded recently, there is an increasing demand for digital broadcasting services to support various reception methods. Also, there is an increasing demand for transmission of data of various pockets consisting of not only an MPEG2-TS packet traditionally used through a broadcasting network but also a packet based on an Internet protocol.

According to such demands, the standard group has established various standards, and is providing various services that can satisfy users' needs. Thus, under this circumstance, there is a demand for search of a method for providing better services through better performance by using generic-purpose data.

DETAILED DESCRIPTION OF THE INVENTION

Technical Problem

The purpose of the disclosure is in providing a transmitting device that generates a packet by inserting padding such that influence according to an error of a packet is minimized, and a transmitting method thereof.

Technical Solution

A transmitting device according to an embodiment of the disclosure for achieving the aforementioned purpose includes a processor generating a packet including a header and a payload on the basis of an input packet, and generating a frame including the generated packet, and a transmitter transmitting a signal generated on the basis of the frame. Here, the processor may insert padding into at least one packet among a plurality of packets included in the frame on the basis of the number of packets included in the frame, the length of each input packet included in the frame, and the lengths of the packets, and the boundary of the input packet may be included in the packet into which padding is inserted.

Also, the processor may allot a plurality of input packets to the plurality of packets such that the boundary of the last input packet among the input packets included in the packet is included in the packet, and insert the padding into the remaining part of the at least one packet.

In addition, the processor may acquire the length of padding to be inserted into the frame, and based on the remaining part after allotting at least one input packet to the packet being smaller than or equal to the acquired length of padding, insert padding into the packet.

Further, the processor may acquire a first value which is the result of multiplying the number of the packets to be transmitted from the frame with the lengths of the packets, acquire a second value which is the result of adding the sum of the header lengths of the packets and the lengths of the input packets to be transmitted from the frame, and subtract the second value from the first value and acquire the length of padding to be inserted into the frame.

Also, the transmitting device may include a buffer storing a plurality of input packets to be transmitted from the frame. In this case, the processor may allot the plurality of input packets to the plurality of packets included in the frame on the basis of the number of bits to be transmitted from the frame, the number of the plurality of input packets, the lengths of the plurality of input packets, and the lengths of the packets included in the frame, and insert padding into the remaining part of at least one of the plurality of packets.

In addition, the processor may calculate the amount of padding to be inserted into the packet on the basis of the length of the header that varies according to insertion of the padding.

Further, the header of the packet may include a field including a value indicating the length of the padding, and the processor may calculate the amount of padding to be inserted into the packet on the basis of the length of the field according to insertion of the padding.

Also, the header of the packet may include a field including a pointer value, and the pointer value may be the offset from the starting location of the payload to the first starting location among at least one input packet starting from the payload, and the processor may calculate the amount of padding to be inserted into the packet on the basis of the length of the field according to insertion of the padding.

In addition, the packet may include a packet for a first RF channel and a packet for a second RF channel, and the processor may allot the plurality of input packets to each of the boundaries of the packets for the first and second RF channels such that the boundaries of the plurality of input packets are included in the boundaries of the packets for the first and second RF channels, and insert padding into the remaining parts of the packets for the first and second RF channels.

Meanwhile, a transmitting method of a transmitting device according to an embodiment of the disclosure may include the steps of generating a packet including a header and a payload on the basis of an input packet, generating a frame including the generated packet, and transmitting a signal generated on the basis of the frame. Also, in the step of generating a packet, padding may be inserted into at least one packet among a plurality of packets included in the frame on the basis of the number of packets included in the frame, the length of each input packet included in the frame, and the lengths of the packets, and the boundary of the input packet may be included in the packet into which padding is inserted.

In addition, in the step of generating a packet, a plurality of input packets may be allotted to the plurality of packets such that the boundary of the last input packet among the input packets included in the packet is included in the packet, and the padding may be inserted into the remaining part of the at least one packet.

Further, in the step of generating a packet, the length of padding to be inserted into the frame may be acquired, and based on the remaining part after allotting at least one input packet to the packet being smaller than or equal to the acquired length of padding, padding may be inserted into the packet.

Also, in the step of generating a packet, a first value which is the result of multiplying the number of the packets to be transmitted from the frame with the lengths of the packets may be acquired, and a second value which is the result of adding the sum of the header lengths of the packets and the lengths of the input packets to be transmitted from the frame may be acquired, and the second value may be subtracted from the first value and the length of padding to be inserted into the frame may be acquired.

In addition, the transmitting device may include a buffer storing a plurality of input packets to be transmitted from the frame, and in the step of generating a packet, the plurality of input packets may be allotted to the plurality of packets included in the frame on the basis of the number of bits to be transmitted from the frame, the number of the plurality of input packets, the lengths of the plurality of input packets, and the lengths of the packets included in the frame, and padding may be inserted into the remaining part of at least one of the plurality of packets.

Further, in the step of generating a packet, the amount of padding to be inserted into the packet may be calculated on the basis of the length of the header that varies according to insertion of the padding.

Also, the header of the packet may include a field including a value indicating the length of the padding, and in the step of generating a packet, the amount of padding to be inserted into the packet may be calculated on the basis of the length of the field according to insertion of the padding.

In addition, the header of the packet may include a field including a pointer value, and the pointer value may be the offset from the starting location of the payload to the first starting location among at least one input packet starting from the payload, and in the step of generating a packet, the amount of padding to be inserted into the packet may be calculated on the basis of the length of the field according to insertion of the padding.

Further, the packet may include a packet for a first RF channel and a packet for a second RF channel, and in this case, in the step of generating a packet, the plurality of input packets may be allotted to each of the boundaries of the packets for the first and second RF channels such that the boundaries of the plurality of input packets are included in the boundaries of the packets for the first and second RF channels, and padding may be inserted into the remaining parts of the packets for the first and second RF channels.

Effect of the Invention

According to the various embodiments of the disclosure as described above, padding can be inserted effectively such that influence according to an error of a packet is minimized.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR IMPLEMENTING THE INVENTION

Hereinafter, the various embodiments of the disclosure will be described in detail with reference to the accompanying drawings.

It is obvious that the device and the method suggested in an embodiment of the disclosure can be applied to a digital multimedia broadcasting (DMB, hereinafter, referred to as 'DMB') service, and mobile broadcasting services such as a digital video broadcasting for handheld (digital video broadcasting handheld: DVP-H, hereinafter, referred to as 'DVP-H') service and an advanced television systems committee for mobile/handheld (an advanced television systems committee mobile/handheld: ATSC-M/H, hereinafter, referred to as 'ATSC-M/H') service, etc., a digital video broadcasting system such as an Internet protocol television (Internet protocsion: IPTV, hereinafter, referred to as 'IPTV') service, an MPEG media transport (moving picture experts group (MPEG) media transport: MMT, hereinafter, referred to as 'MMT') system, an evolved packet system (EPS, hereinafter, referred to as 'EPS'), and various communication systems such as a long-term evolution (LTE, hereinafter, referred to as 'LTE') mobile communication system, a long-term evolution-advanced (LTE-A, hereinafter, referred to as 'LTE-A') mobile communication system, a high speed downlink packet access (HSDPA, hereinafter, referred to as 'HSDPA') mobile communication system, a high speed uplink packet access (HSUPA, hereinafter, referred to as 'HSUPA') mobile communication system, a high rate packet data (HRPD, hereinafter, referred to as 'HRPD') mobile communication system of the 3rd generation project partnership 2 (3GPP2, hereinafter, referred to as '3GPP2'), a wideband code division multiple access (WCDMA, hereinafter, referred to as 'WCDMA') mobile communication system of the 3GPP2, a 802.16m communication system of the institute of electrical and electronics engineers (IEEE, hereinafter, referred to as 'IEEE'), and a mobile Internet protocol (Mobile IP, hereinafter, referred to as 'Mobile IP') system, etc.

Figure 1:
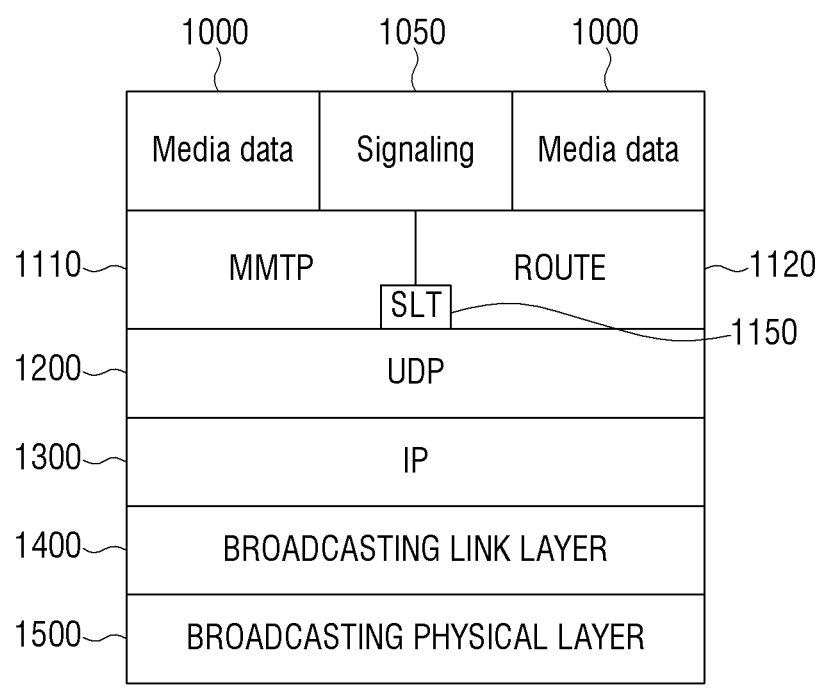
FIG. 1 is a diagram for illustrating a layered structure of a transmission system according to an embodiment of the disclosure.

FIG. 1 is a diagram for illustrating a layered structure of a transmission system according to an embodiment of the disclosure.

Referring to FIG. 1, a service includes media data 1000 constituting the service and signaling 1050 for transmitting information necessary for acquiring and consuming media data at a receiver. Media data may be encapsulated in a form that is appropriate for transmission before transmission. An encapsulation method may follow the Media Processing Unit (MPU) defined in the ISO/IEC 23008-1 MPEG Media Transport (MMT) or the DASH segment method defined in the ISO/IEC 23009-1 Dynamic Adaptive Streaming over HTTP (DASH). The media data 1000 and the signaling 1050 are packetized by an application layer protocol.

FIG. 1 illustrates a case wherein an MMT protocol (MMTP) 1110 defined in the MMT and a Real-Time Object Delivery over Unidirectional Transport (ROUTE) protocol 1120 are used as application layer protocols. Here, for figuring out to which application layer protocol a specific service has been transmitted at the receiver, a method for providing information on the application protocol to which the service is transmitted is required as an independent method from an application layer protocol.

The Service List Table (SLT) 1150 illustrated in FIG. 1 constitutes information on services as a table by a signaling method for satisfying the aforementioned purpose, and packetizes this. Detailed content on the SLT will be described below. Signaling including the aforementioned packetized media data and SLT passes through a User Datagram Protocol (UDP) 1200 and an Internet Protocol (IP) 1300 and is transmitted to a broadcasting link layer 1400. As an example of a broadcasting link layer, there is an ATSC 3.0 Link-Layer Protocol (ALP) defined in the ATSC 3.0. The ALP protocol generates an ALP packet with an IP packet as an input and transmits the ALP packet to a broadcasting physical layer 1500.

Meanwhile, according to FIG. 2 that will be described below, it should be noted that the broadcasting link layer 1400 does not use only an IP packet 1300 including media data or signaling as an input, but it can also use an MPEG2-TS packet or packetized data in a general form as an input. Here, signaling information necessary for control of a broadcasting link layer is also transmitted to the broadcasting physical layer 1500 in a form of an ALP packet.

The broadcasting physical layer 1500 performs signal processing with the ALP packet as an input and generates a physical layer frame, and converts the physical layer frame into a wireless signal and transmits the signal. Here, the broadcasting physical layer 1500 has at least one signal processing route. As an example of a signal processing route, there is a DVB-T2 or a Physical Layer Pipe (PLP) of the ATSC 3.0, and with a PLP, all of one or more services may be mapped or some of services may be mapped.

Figure 2:
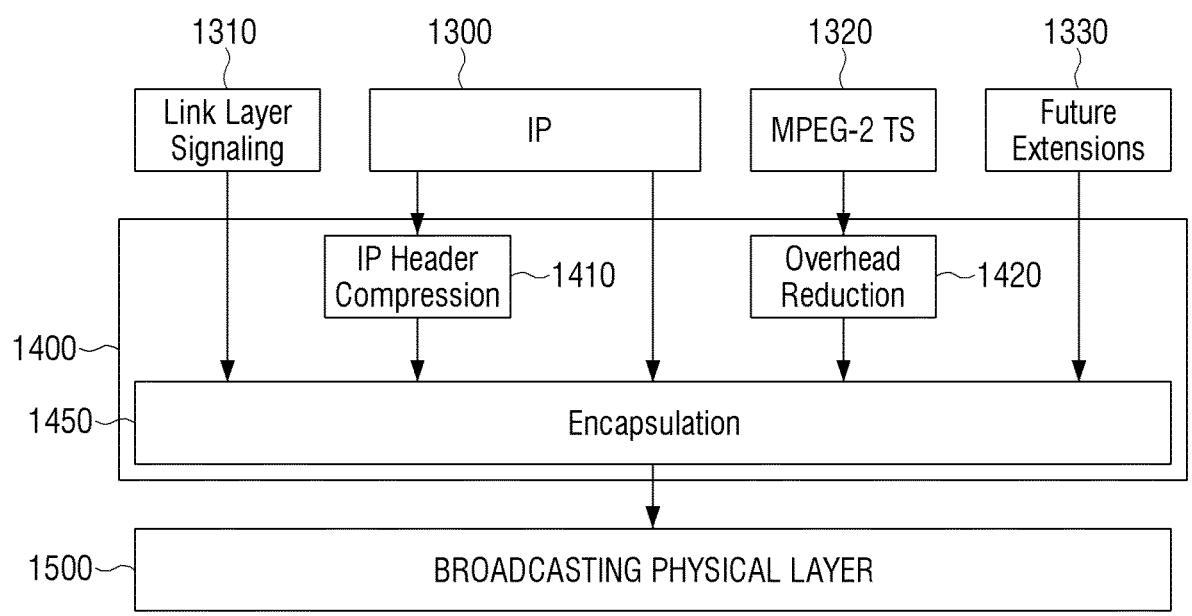
FIG. 2 is a diagram for illustrating a schematic configuration of the broadcasting link layer 1400 according to an embodiment of the disclosure.

FIG. 2 is a diagram for illustrating a schematic configuration of the broadcasting link layer 1400 according to an embodiment of the disclosure.

Referring to FIG. 2, an input of the broadcasting link layer 1400 may include the IP packet 1300, and it may further include link layer signaling 1310, an MPEG2-TS packet 1320, and other packetized data 1330.

Input data may go through an additional signal processing process according to the type of input data before ALP packetization 1450. As an example of an additional signal processing process, in the case of the IP packet 1300, input data may go through an IP header compressing process 1410, and in the case of the MPEG2-TS packet, input data may go through a TS header compressing process 1420. In the process of ALP packetization, input packets may go through partitioning and merging processes.

Figure 3A:
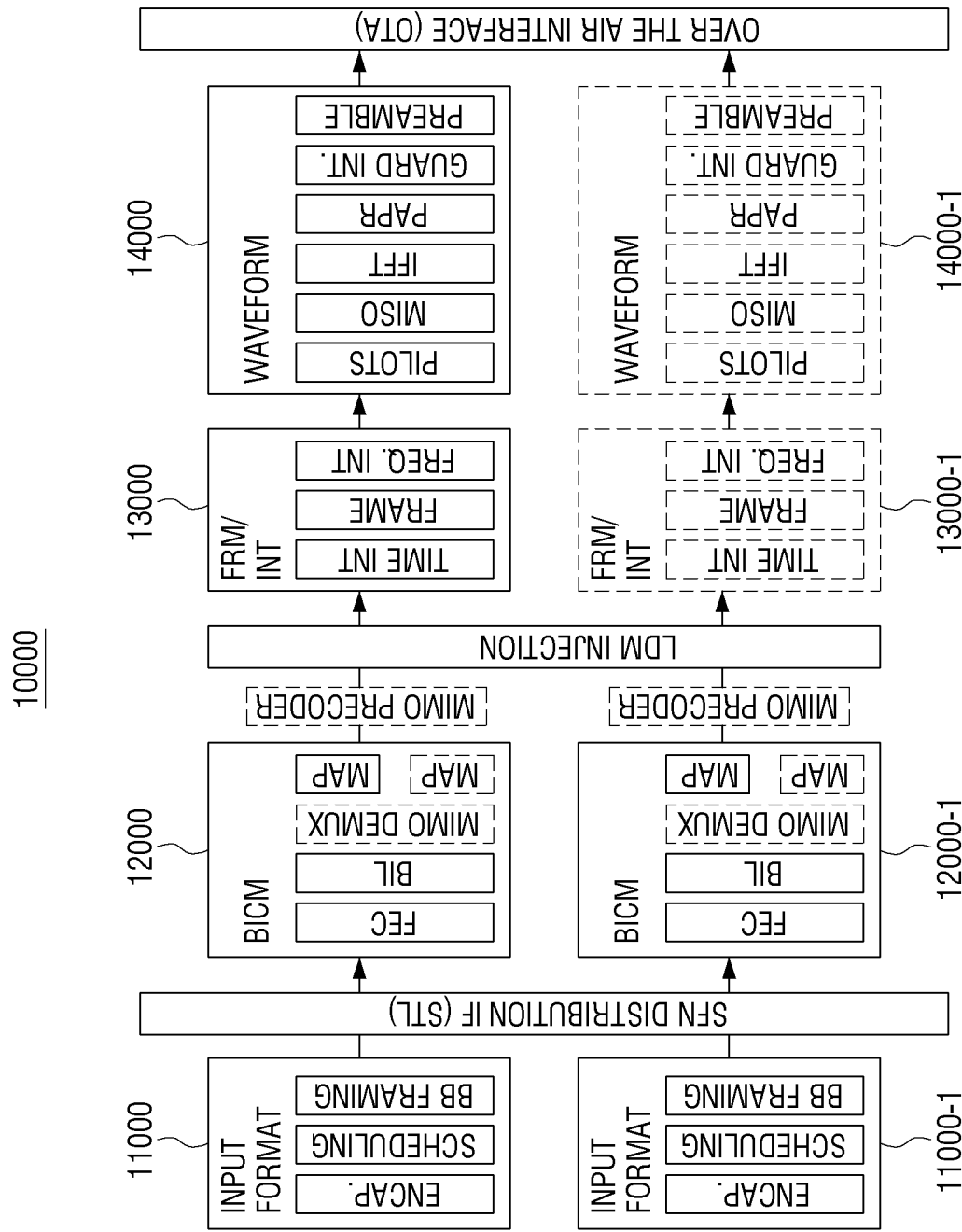
FIG. 3A is a diagram for illustrating a schematic configuration of a transmission system (or a transmitting device) according to an embodiment of the disclosure.

FIG. 3A is a diagram for illustrating a schematic configuration of a transmission system (or a transmitting device) according to an embodiment of the disclosure. According to FIG. 3A, a transmission system 10000 according to an embodiment of the disclosure may include Input Formatting blocks (or parts) 11000, 11000-1, Bit Interleaved and Coded Modulation (BICM) blocks 12000, 12000-1, Framing/Interleaving blocks 13000, 13000-1, and Waveform Generation blocks 14000, 14000-1.

The Input Formatting blocks (or parts) 11000, 11000-1 generate a physical layer packet, for example, a baseband packet from an input stream for data to be serviced. Here, an input stream may be a Transport Stream (TS), Internet Packets (IP) (e.g., IPv4, IPv6), MPEG Media Transport (MMT), a Generic Stream (GS), Generic Stream Encapsulation (GSE), etc. For example, based on an input stream including an IP, an ATSC 3.0 Link Protocol (ALP) packet may be generated, and a baseband packet may be generated based on the generated ALP packet. The Bit Interleaved and Coded Modulation (BICM) blocks 12000, 12000-1 determine an FEC coding rate and a constellation order according to an area to which data to be serviced will be transmitted (a Fixed PHY Frame or a Mobile PHY Frame) and perform encoding, and perform time interleaving. Meanwhile, signaling information for data to be serviced may be encoded through a separate BICM encoder or encoded by sharing a BICM encoder with data to be serviced, depending on embodiments.

The Framing/Interleaving blocks 13000, 13000-1 combine the time-interleaved data with a signaling signal and generate a transmission frame.

The Waveform Generation blocks 14000, 14000-1 generate an OFDM signal in a time area for the generated transmission frame, and modulate the generated OFDM signal into an RF signal and transmit the signal to the receiver.

The transmission system 10000 according to an embodiment of the disclosure illustrated in FIG. 3A includes normative blocks indicated in full lines and informative blocks indicated in dotted lines. Here, the blocks indicated in full lines are normal blocks, and the blocks indicated in dotted lines are blocks that can be used in the case of implementing an informative MIMO.

Figure 3B:
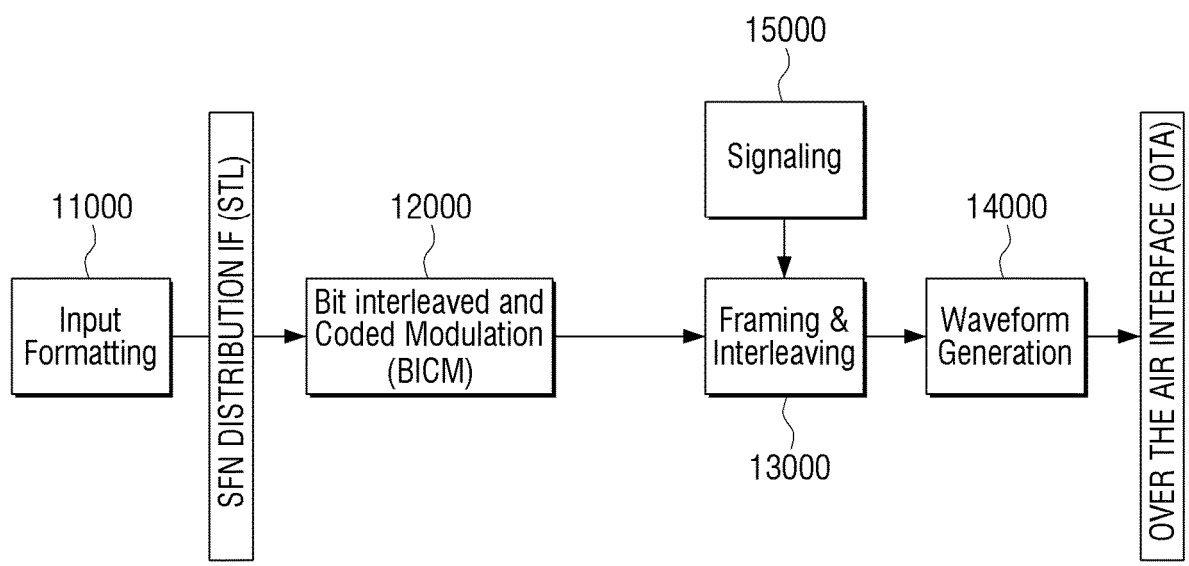
FIG. 3B and FIG. 3C are diagrams for illustrating a multiplexing method according to an embodiment of the disclosure.
Figure 3C:
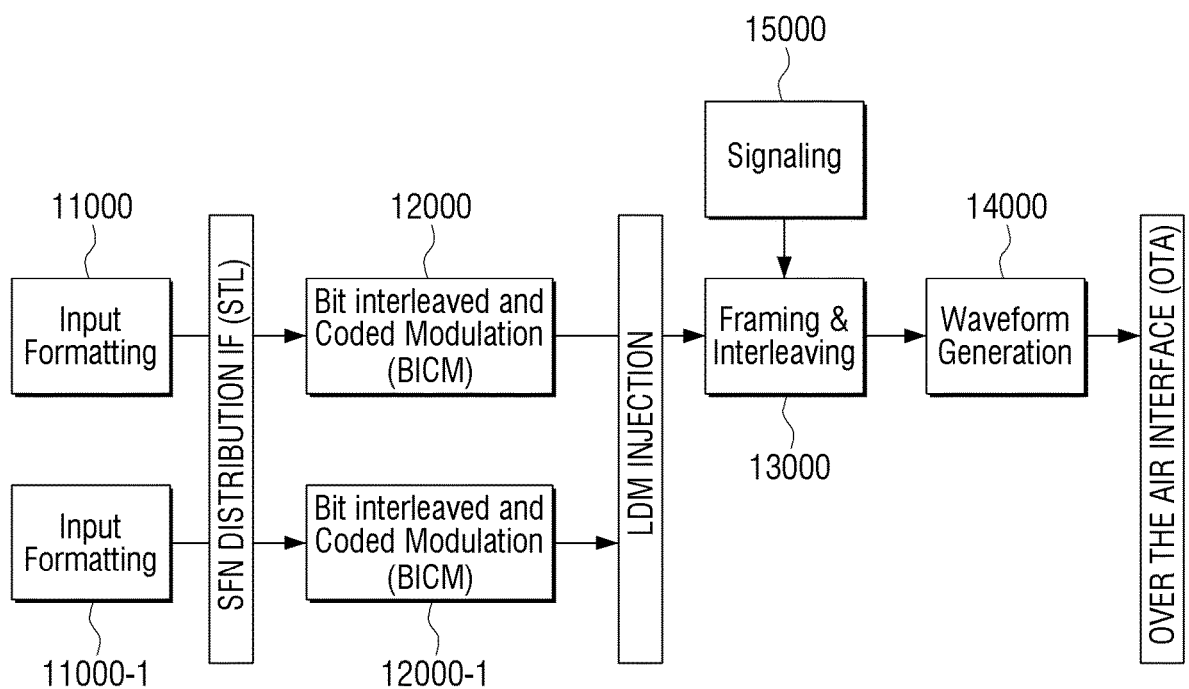

FIG. 3B and FIG. 3C are diagrams for illustrating a multiplexing method according to an embodiment of the disclosure.

FIG. 3B illustrates a block diagram for implementing Time Division Multiplexing (TDM) according to an embodiment of the disclosure.

In a TDM system architecture, there are four main blocks (or parts) which are the Input Formatting block 11000, the BICM block 12000, the Framing/Interleaving block 13000, and the Waveform Generation block 14000.

Data is input into the Input Formatting block 11000 and formatted, and omnidirectional error correction is applied at the BICM block 12000, and the data is mapped to constellations. Then, at the Framing/Interleaving block 13000, time and frequency interleaving is performed, and frame generation is performed. Afterwards, an output waveform is generated at the Waveform Generation block 14000.

FIG. 3C illustrates a block diagram for implementing Layered Division Multiplexing (LDM) according to another embodiment of the disclosure.

In an LDM system architecture, some different blocks compared to the TDM system architecture exist. Specifically, two separated Input Formatting blocks 11000, 11000-1, and BICM blocks 12000, 12000-1 exist for one among each layer of the LDM. These blocks are combined before the Framing/Interleaving block 13000 at the LDM injection block. Also, the Waveform Generation block 14000 is similar to the TDM.

Figure 4:
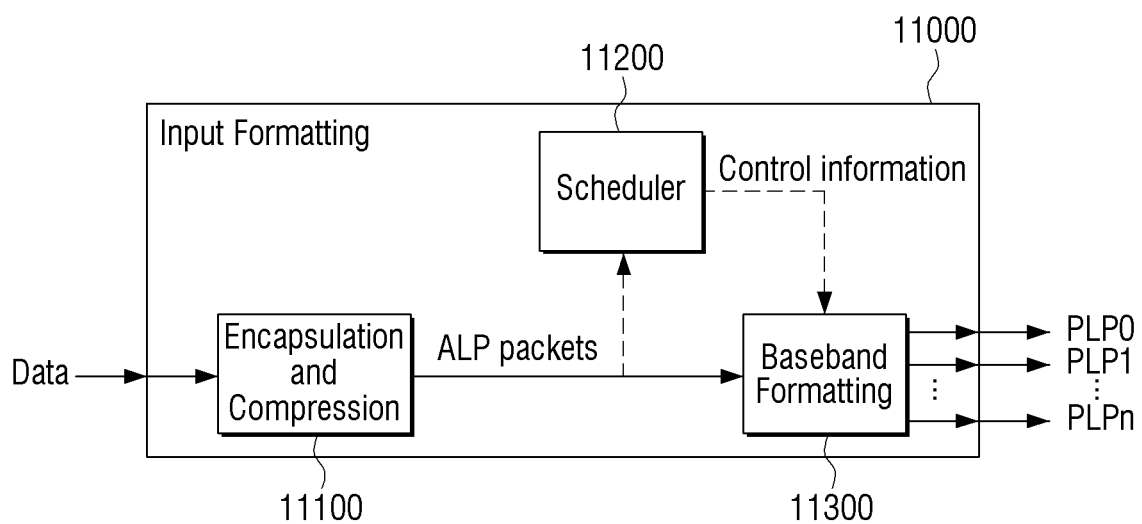
FIG. 4 is a block diagram illustrating the detailed configuration of the Input Formatting block illustrated in FIG. 3A.

FIG. 4 is a block diagram illustrating the detailed configuration of the Input Formatting block illustrated in FIG. 3A.

As illustrated in FIG. 4, the Input Formatting block 11000 consists of three blocks controlling packets distributed to PLPs. Specifically, the Input Formatting block 11000 includes an encapsulation and compression block 11100, a scheduler block 11200, and a baseband formatting (or a baseband framing) block 11300.

An input stream input into the encapsulation and compression block 11100 may be various types. For example, an input stream may be a Transport Stream (TS), Internet Packets (IP) (e.g., IPv4, IPv6), MPEG Media Transport (MMT), a Generic Stream (GS), Generic Stream Encapsulation (GSE), etc.

Packets output from the encapsulation and compression block 11100 become ALP packets (generic packets) (or ALP packets, L2 packets). Here, the format of the ALP packets may be one of TLV/GSE/ALP.

The length of each ALP packet is variable. The length of an ALP packet may be extracted easily from the ALP packet itself without additional information. The maximum length of an ALP packet is 64 kB. The maximum length of an ALP packet including a header is 4 bytes. An ALP packet becomes the length of an integer byte.

The scheduler block 11200 receives an input stream including encapsulated ALP packets and forms physical layer pipes (PLPs) in the form of a baseband packet. In the aforementioned TDM system, only one PLP that is referred to as a single PLP or an S-PLP may exist, or multiple PLPs that are referred to as M-PLP may exist. One service may not use more than four PLPs. In the case of an LDM system including two layers, two PLPs are used, i.e., one PLP for each layer.

The scheduler block 11200 receives encapsulated ALP packets and designates how the packets will be allotted to a physical layer resource. Specifically, the scheduler block 11200 designates how the baseband formatting block 11300 will output the baseband packet.

The function of the scheduler block 11200 is defined by the data size and time. The physical layer may transmit some of the data in such dispersed time. The scheduler block generates a solution that is appropriate in terms of the configuration of the physical layer parameter by using inputs and information such as the encapsulated data packets, the quality of service metadata for the encapsulated data packets, the system buffer model, and the constraints and configuration from the system management. The solution becomes the subject of an available configuration and a control parameter, and an aggregate spectrum.

Meanwhile, the operations of the scheduler block 11200 are limited to an aggregate of dynamic, quasi-static, and static components. Definition of such limitation may vary depending on embodiments.

Also, for each service, four PLPs at maximum may be used. A plurality of services including interleaving blocks of a plurality of types may consist of 64 PLPs at maximum for a bandwidth of 6, 7, or 8 MHz.

Figure 5A:
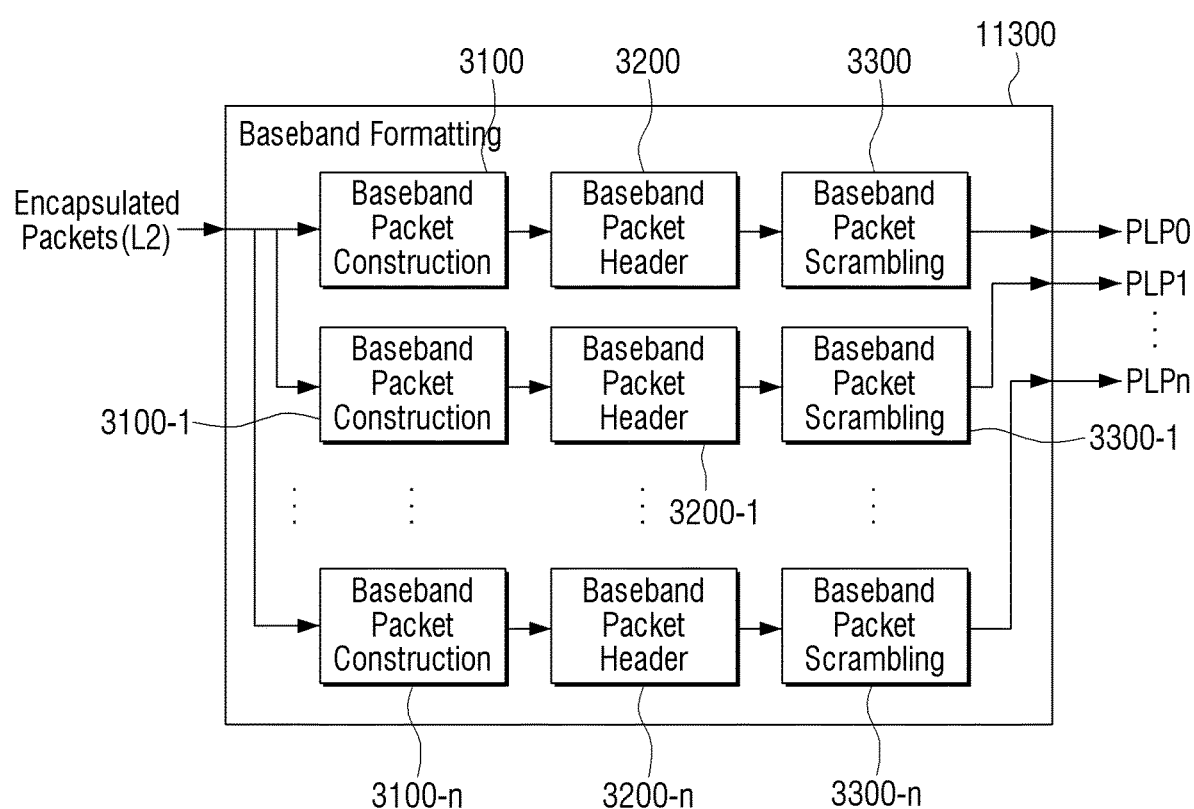
FIG. 5A is a diagram illustrating baseband formatting according to an embodiment of the disclosure.

The baseband formatting block 11300 consists of three blocks which are baseband packet construction blocks 3100, 3100-1, . . . 3100-n, baseband packet header construction blocks 3200, 3200-1, . . . 3200-n, and baseband packet scrambling blocks 3300, 3300-1, . . . 3300-n, as illustrated in FIG. 5A. In an M-PLP operation, the baseband formatting block generates a plurality of PLPs depending on needs.

Figure 5B:
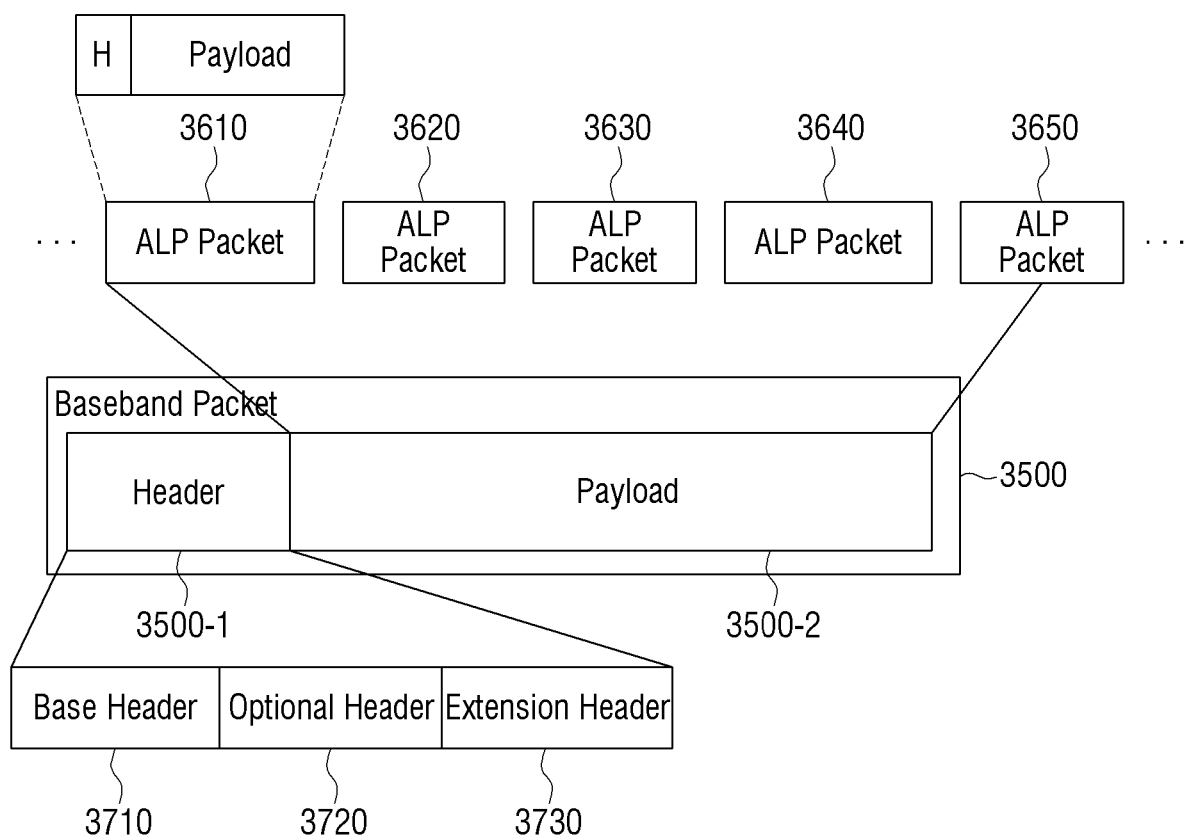
FIG. 5B is a diagram illustrating a baseband packet according to an embodiment of the disclosure.

The baseband packet construction blocks 3100, 3100-1, . . . 3100-n constitute baseband packets. Each baseband packet 3500 includes a header 3500-1 and a payload 3500-2, as illustrated in FIG. 5B. A baseband packet is fixed to the length Kpayload. The ALP packets 3610 to 3650 are sequentially mapped to the baseband packet 3500. Here, the ALP packets 3610 to 3650 obviously include headers and payloads.

The baseband packet header construction blocks 3200, 3200-1, . . . 3200-n constitute (or generate) a header 3500-1. The header 3500-1 includes three parts, i.e., a base field (or a base header) 3710, an option field (or an option header) 3720, and an extension field (or an extension header) 3730, as illustrated in FIG. 5B. Here, the base field 3710 may appear in each baseband packet, and the option field 3720 and the extension field 3730 may not appear in each baseband packet.

The main function of the base field 3710 is providing an offset value from a baseband packet to the start of an ALP packet. If the start of an ALP packet and the start (of a payload) of a baseband packet coincide, the pointer value becomes 0. If there is no ALP packet that starts in a baseband packet, the point value is 8191, and a base header of two bytes may be used.

The extension field 3730 may be utilized later, and for example, it may be used for a baseband packet counter, baseband packet time stamping, additional signaling, etc.

The baseband packet scrambling blocks 3300, 3300-1, . . . 3300-n scramble baseband packets.

Like in a case wherein payload data mapped to constellations consists of repetitive sequences, in order that payload data is not always mapped to the same point, payload data is always scrambled before encoding of directional error correction.

Figure 6:
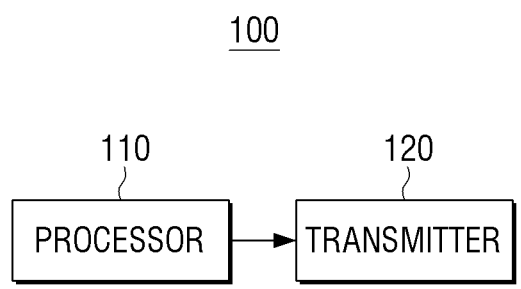
FIG. 6 is a block diagram illustrating a configuration of a transmitting device according to an embodiment of the disclosure.

FIG. 6 is a block diagram illustrating a configuration of a transmitting device according to an embodiment of the disclosure.

According to FIG. 6, the transmitting device 100 includes a processor 110 and a transmitter 120.

The processor 110 may encapsulate an input packet and generate a packet. Here, an input packet may be implemented as, for example, the aforementioned link layer packet (or an L2 packet) (e.g., an ALP packet), and a packet may be implemented as the aforementioned physical layer packet (or an L1 packet) (e.g., a baseband packet) (refer to FIG. 5B). That is, an input packet may be a packet that is generated by encapsulating at least one of an IP packet, a TS packet, and a signaling packet. Such an operation may be performed at the baseband packet construction blocks 3100, 3100-1, . . . 3100-n in the baseband formatting (or the baseband framing) block 11300 of the Input Formatting block 11000 (refer to FIG. 5A and FIG. 5B).

Specifically, the processor 110 generates a packet including a header and a payload based on an input packet (refer to FIG. 5B). Here, the header may include at least one of information on the payload included in the packet or information on the packet included in the packet.

In this case, the processor 110 may insert padding into at least one packet among a plurality of packets included in a transmission frame on the basis of the number and lengths of packets to be transmitted within a unit time (e.g., a frame or a transmission frame), and the length of each input packet that will be included in the frame. Here, the boundary of the input packet may be included in the packet into which padding is inserted. Meanwhile, a unit time may be various units for allotting resources such as a sub frame, a baseband packet group, etc., other than a transmission frame.

Specifically, when the processor 110 generates a packet by including an input packet in the payload of the packet, the processor 110 may allot a plurality of input packets respectively to a plurality of packets included in one frame on the basis of the number and lengths of packets to be included in the frame, and the length of each input packet to be included in the frame, and insert padding into the remaining parts of the packets.

When the processor 110 allots a plurality of input packets to a plurality of packets, the processor 110 may allot the packets such that the boundary of at least one input packet among the plurality of input packets is included in a packet. In particular, the processor 110 may allot the packets such that the boundary of the last input packet among the input packets to be included in a packet is included in the packet.

According to an embodiment of the disclosure, the length of an input packet and the length of a packet may be different. In this case, the lengths of input packets may be identical or different, and the lengths of packets may be identical or different. However, for the convenience of explanation, it will be assumed that the lengths of inputs packets are different, and packets have a predetermined length.

For generating packets having a predetermined length based on input packets, at least some of input packets may be fragmented and included in the payloads of packets. In this case, the processor 110 may allot input packets to packets such that the input packets are included in the payloads of the packets without being fragmented as far as possible. That is, the processor 110 may allot input packets to each packet such that the boundaries of the input packets are included inside the packets.

For example, in the case of including input packets sequentially in packets to be included in a frame, at least one input packet included in the packets may be included while being fragmented, and according to an embodiment of the disclosure, input packets may be allotted to each packet such that they are not fragmented as far as possible. Meanwhile, not all input packets included in packets may be fragmented, but at least some input packets may be included while being fragmented. For example, in case at least two input packets included in packets should be fragmented as input packets are sequentially included in packets to be included in a frame, the processor 110 may generate packets by allotting input packets such that not all input packets included in packets are fragmented or only one input packet is fragmented, and insert padding into the remaining parts.

According to an embodiment of the disclosure, in a buffer (not shown), a plurality of input packets to be transmitted through one transmission frame may be stored. Here, the buffer (not shown) may be a buffer provided on the transmitting device 100 for generation of resource management and L1 signaling, but the disclosure is not limited thereto.

In this case, the processor 110 may allot the input packets stored in the buffer (not shown) to packets on the basis of the number of the entire data bits to be transmitted during a time corresponding to one transmission frame, the number and lengths of the input packets, and the number and lengths of the baseband packets.

Meanwhile, the processor 110 may identify the number of the entire data bits to be transmitted during a time corresponding to one transmission frame, and dynamically determine the modulation and the code rate to be applied to each PLP of the frame and apply them.

The processor 110 may acquire the length of padding to be inserted into a frame, and allot at least one input packet to a packet, and then, if the remaining part after allotting at least one input packet is smaller than or equal to the acquire length of padding, the processor 110 may insert padding into the packet.

Specifically, the processor 110 may acquire a first value which is the result of multiplying the number of packets to be transmitted from a frame with the lengths of the packets, and acquire a second value which is the result of adding the sum of the header lengths of the packets and the lengths of the input packets to be transmitted from the frame, and subtract the second value from the first value and acquire the length of padding to be inserted into the frame.

In this case, the processor 110 may calculate the amount of padding to be inserted into a packet on the basis of the length of a header that varies according to insertion of the padding.

According to an embodiment of the disclosure, a header of a packet may include a field including a value indicating the length of padding. In this case, the processor 110 may calculate the amount of padding to be inserted into the packet on the basis of the length of the field according to insertion of the padding. Here, the field including the value indicating the length of the padding may also be used as the padding of the packet.

According to another embodiment of the disclosure, a header of a packet may include a field including a pointer value. Here, the pointer value may indicate an offset from the starting location of a payload to the first starting location among at least one input packet starting from the payload or an offset from the last part of the header to the first starting location among at least one input packet starting from the payload. For example, in case padding is inserted after a header and a payload including input packets is located, a pointer value may be variable according to the amount of the padding. Accordingly, the length of the field including the pointer value may also be variable, and thus the amount of padding to be inserted into a packet may be calculated on the basis of the length of the field according to insertion of the padding.

According to an embodiment of the disclosure, a packet may include a packet for a first RF channel and a packet for a second RF channel. In this case, the processor 110 may allot a plurality of input packets to each of the boundaries of the packets for the first and second RF channels such that the boundaries of the plurality of input packets are included in the boundaries of the packets for the first and second RF channels, and insert padding into the remaining parts of the packets for the first and second RF channels.

Meanwhile, the processor 110 may insert padding into at least one of between a header and a payload of a packet, or the next (or the later) part of a payload of a packet. As an example, when input packets allotted to a packet and the amount of padding to be inserted are determined, the processor 110 may insert padding after the header, and insert the allotted input packets to the remaining part, and thereby encapsulate the packet. As another example, when input packets allotted to a packet and the amount of padding to be inserted are determined, the processor 110 may insert the allotted input packets after the header, and then insert padding into the remaining part, and thereby encapsulate the packet.

Meanwhile, the embodiments of the disclosure can obviously be used in a case of generating a physical layer packet based on a link layer packet, but also in generation of a link layer packet and other various packets.

Then, the processor 110 generates a frame including the generated packet. Here, the frame may be implemented as the aforementioned physical layer frame (or a transmission frame).

Afterwards, the processor 110 may process the generated frame and generate a transmission signal.

For example, the processor 110 may generate an OFDM signal in a time area for the generated frame, and modulate the generated OFDM signal into an RF signal and transmit the signal to the transmitter 120.

Other than the above, the processor 110 may be implemented to perform at least some functions among the various functions of the aforementioned Input Formatting blocks 11000, 11000-1, the BICM blocks 12000, 12000-1, the Framing/Interleaving blocks 13000, 13000-1, and the Waveform Generation blocks 14000, 14000-1.

The transmitter 120 transmits a signal transmitted from the processor 110, i.e., a signal generated based on a frame. Here, the transmitter 120 may be implemented as an antenna or hardware performing an equivalent function thereto.

Figure 7:
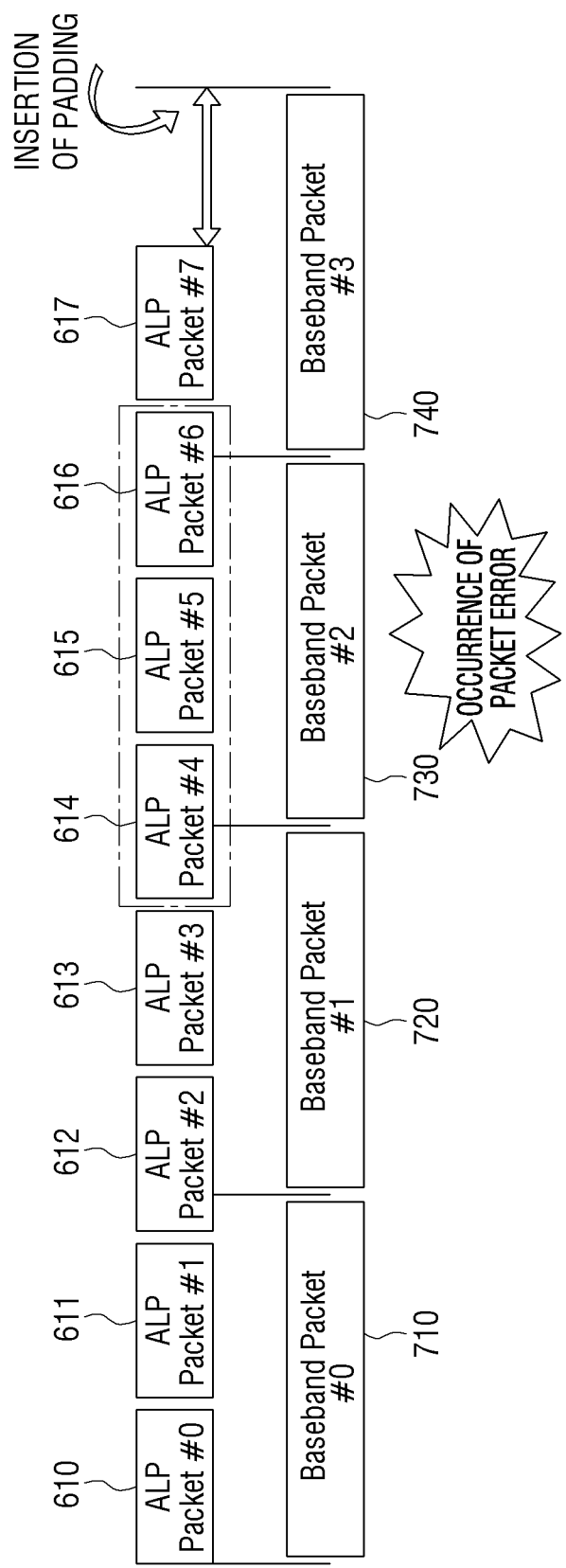
FIG. 7 is a diagram for illustrating a method of generating a packet for promoting understanding of the disclosure.

FIG. 7 is a diagram for illustrating a method of generating a packet for promoting understanding of the disclosure.

As illustrated in FIG. 7, a case wherein a packet is generated by sequentially allotting eight input packets (#0 to #7) to four packets (#0 to #3) will be assumed. Here, the number of packets may be designated as the number of packets transmitted through one transmission frame.

Based on the lengths of the eight input packets 610 to 617 and the lengths of the four packets 710 to 740, as illustrated in FIG. 7, the third input packet 612 may be fragmented and inserted into the first and second packets 710, 720, and the fourth input packet 614 may be fragmented and inserted into the second and third packets 720, 730, and the seventh input packet 616 may be fragmented and inserted into the third and fourth packets 730, 740. Afterwards, the remaining part of the fourth packet 740 may be filled with padding.

In this case, if an error occurs in the third packet 730, the front end part of the seventh input packet 616 encapsulated to the third packet 730 cannot be used. Thus, a problem that, even if an error does not occur in the fourth packet 740, the seventh input packet 617 included in the fourth packet 740 cannot be restored occurs.

Figure 8:
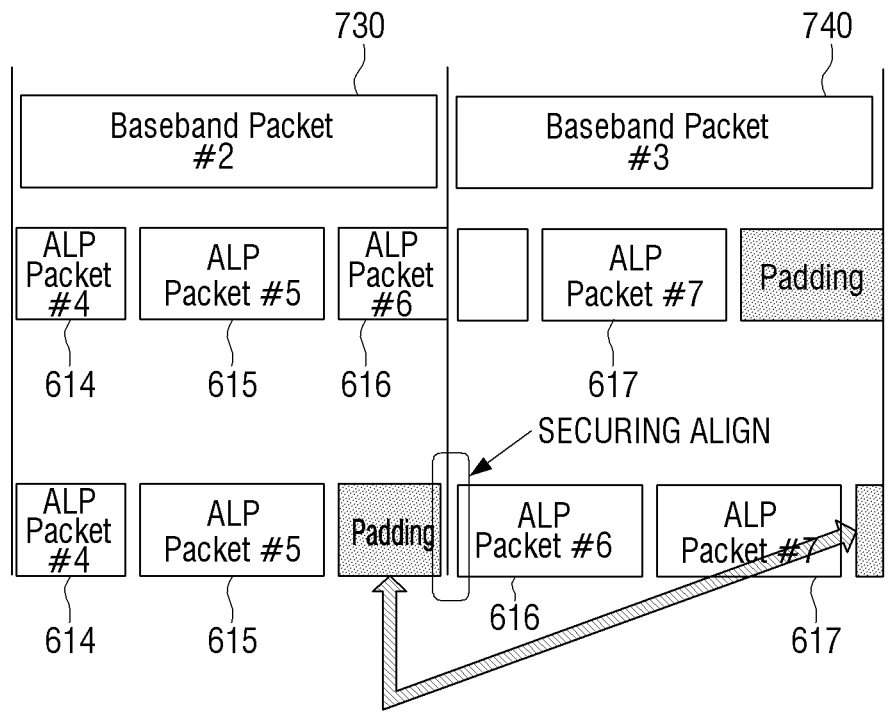
FIG. 8 is a diagram for illustrating a method of generating a packet according to an embodiment of the disclosure.

FIG. 8 is a diagram for illustrating a method of generating a packet according to an embodiment of the disclosure.

According to an embodiment of the disclosure, the input packets 610 to 617 may be allotted to the packets 710 to 740 such that the boundaries of the input packets 610 to 617 are included in the packets 710 to 740 as far as possible, and padding may be inserted into the remaining parts of the base packets 710 to 740.

Meanwhile, for the convenience of explanation, explanation will be made based on the third packet 730 and the fourth base band packet 740 in the embodiments illustrated in FIG. 7.

According to an embodiment (the diagram on the lower side) of the disclosure, unlike in the conventional technology (the diagram on the upper side), in order that the seventh input packet 616 allotted to the third packet 730 is not fragmented, only the first to sixth input packets 610 to 615 may be allotted to the third packet 730, and the seventh input packet 616 may be allotted to the fourth packet 740. Accordingly, the remaining part of the third packet 730 is filled with padding.

That is, in the conventional technology, padding is filled based on the last packet among packets included in one transmission frame, but according to an embodiment of the disclosure, padding is dispersed in a plurality of packets.

However, considering the number and lengths of packets, and the number and lengths of input packets included in one transmission frame, it is obvious that the boundaries of all input packets may not be included in packets. However, according to the disclosure, cases wherein one input packet is dispersed in different packets are minimized as far as possible, and accordingly, the number of input packets influenced by errors of packets can be minimized. Also, as padding of the same length as in the conventional technology is inserted, transmission efficiency can be maintained.

FIG. 8 is a diagram for illustrating a method of inserting padding according to an embodiment of the disclosure.

For the convenience of explanation, the unit length L of a packet, the number of packets Nb to be transmitted within a unit time, the header length of each packet H[i] ($0 \leq i < Nb$), the number of input packets Na to be transmitted within a unit time, the length of each input packet La[j] ($0 \leq j < Na$), the number of the entire padding bytes Np (a value of subtracting the length of the entire packet headers and the lengths of input packets from L*Nb), the byte number of input packets included in the ith packet and fragmented F[i] in the case of sequentially mapping input packets to packets, and the index of the last input packet (fragmented or complete) included in the ith packet Ba[i] will be assumed.

In this case, the processor 110 first calculates H[i], F[i] and Ba[i] and identifies whether to insert padding into the ith packet based on the calculated value. Specifically, if F[i] ≤Np, the processor 110 inserts padding into the ith baseband packet.

In the case of inserting padding into the ith packet, the processor 110 may update F[j], Ba[j]($i<j<Nb-1$) and Np values as below.

Np=Np−F[i]

If F[j]≤F[i], F[j]=F[j]−F[i]

If F[j]<F[i], F[j]=La[k]−(F[i]−F[j]), Ba=k

Here, k is the maximum integer satisfying (La[k]+La[k+1]+ . . . +La[Ba[i]−1]≥(F[i]−F[j])).

The processor 110 may repetitively perform the same operation to packets after updating the parameters as above.

Also, the processor 110 may insert the padding byte that ultimately remains into the last packet.

Meanwhile, the processor 110 may perform the aforementioned operation from the first packet, but it is also possible that the processor 110 performs the operation from a predefined Ath packet. For example, it is possible that the processor 110 performs the operation from an Ath packet wherein the probability of occurrence of an error becomes high in consideration of various parameters such as modulation and a code rate, etc.

Meanwhile, according to another embodiment of the disclosure, a header of a packet may need additional bytes according to the length of inserted padding.

For example, a pointer field of a packet signals the length from the start of a payload to the first starting point among input packets included in the packet (the location of the header of the first input packet).

In this case, if padding is inserted into the ith packet, because of the influence of this, F[i] may need to be calculated as a value of adding the number of actual padding bytes and the number of additional header bytes for insertion of padding. This is because the actual padding is inserted before input packets included in a packet. If the value of adding the number of actual padding bytes and the number of additional header bytes for insertion of padding is designated as F[i]', it may be Np'=Np−F[i]'(F[i]+δ(delta)). Here, δ may be the changed amount of the packet header length (the value of adding the increased or reduced amount) in case padding is inserted into the ith packet.

Figure 9:
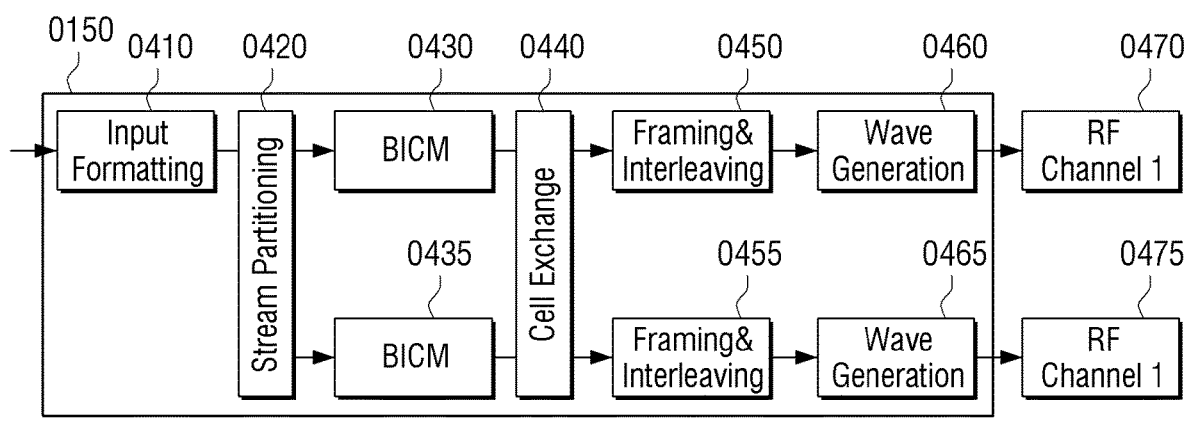
FIG. 9 is a diagram for illustrating a method of inserting padding according to another embodiment of the disclosure.

FIG. 9 is a diagram for illustrating a method of inserting padding according to another embodiment of the disclosure.

FIG. 9 is a diagram for illustrating a case wherein a service is transmitted through channel bonding in a physical layer.

Referring to FIG. 9, data transmitted to a PLP to which channel bonding will be applied is processed at one Input Formatting block 0410. The physical layer packets generated at the Input Formatting block 0410, i.e., the baseband packets are partitioned at the Streaming Partitioning block 0420 and input into each BICM block 0430, 0435.

The Streaming Partitioning block 0420 equally partitions the baseband packets to each BICM block afterwards or partitions the baseband packets according to a specific ratio. The signal values within constellations output at the BICM blocks 0430, 0435 are input as they are into each Framing & Interleaving block 0450, 0455 according to a channel bonding method, or go through a signal processing process for increasing time/frequency diversity at a separate Cell Exchange block 0440 and input into each Framing & Interleaving block 0450, 0455. As an example, a combining method that does not use the Cell Exchange block 0440 is referred to as Plain channel bonding, and a method that uses the Cell Exchange block 0440 is referred to as Channel bonding with SNR averaging.

Afterwards, the signal values go through processing of the Framing & Interleaving blocks 0450, 0455 and the Waveform Generation blocks 0460, 0465 according to each signal transmission path and are transmitted to two frequency bandwidths 0470, 0475. In case channel bonding is used, PLPs sharing the same Input Formatting block 0410 should necessarily use the same identifier value, and the receiver performs signal processing based on this. Also, in case channel bonding is used, information on whether channel bonding is used for each PLP and other frequency bandwidths combined is provided to L1 signaling.

In case channel bonding is applied as above, the idea of the disclosure can be applied when generating baseband packets.

Figure 10:
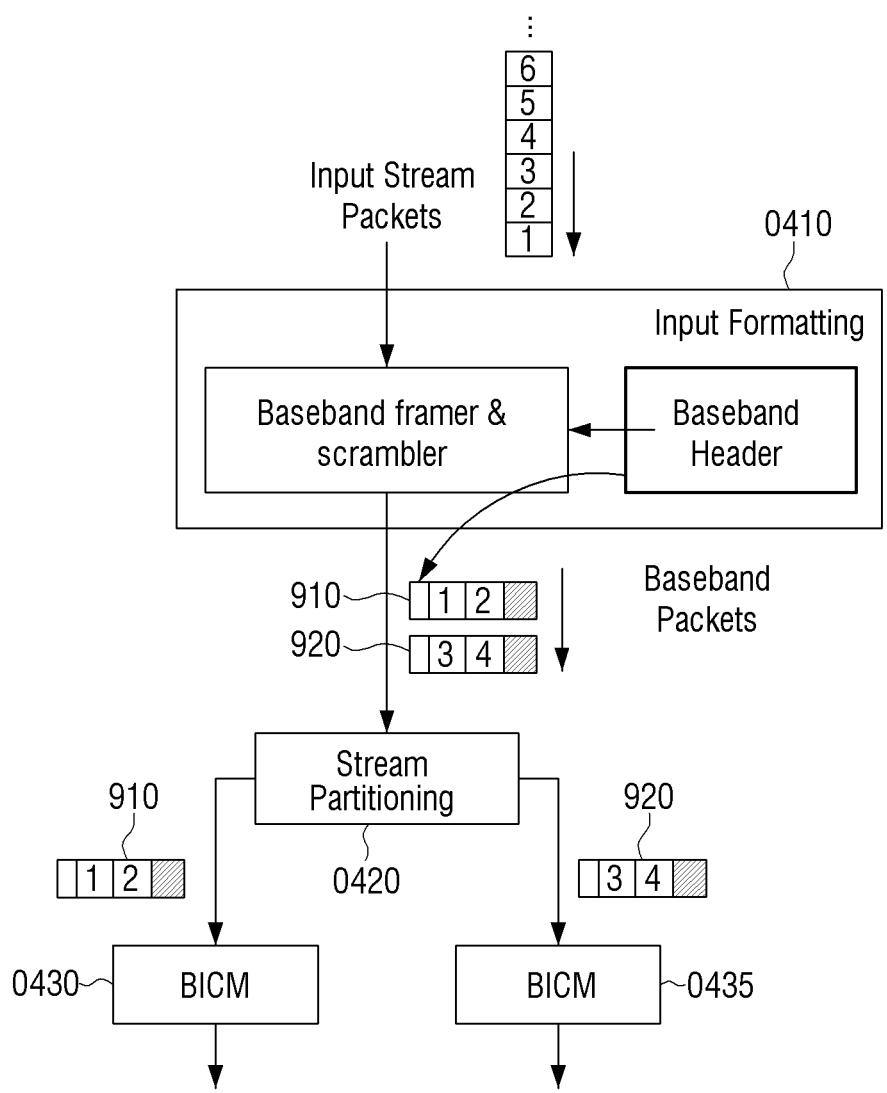
FIG. 10 is a diagram for illustrating a method of generating baseband packets.

Specifically, as illustrated in FIG. 10, when generating the baseband packet 910 for the first RF channel and the baseband packet 920 for the second RF channel, padding is inserted into each of the baseband packet 910 for the first RF channel and the baseband packet 920 for the second RF channel by the same method as described in FIG. 8. Accordingly, in case an error occurs in the baseband packet 910 for the first RF channel, the influence that the error exerts on the baseband packet 920 for the second RF channel can be minimized.

Figure 11A:
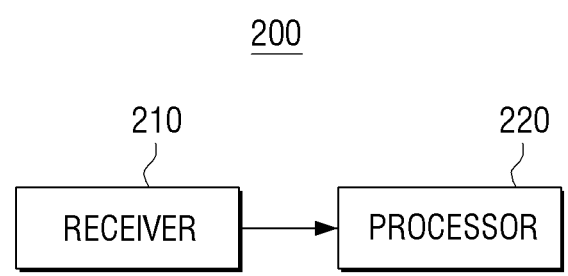
FIGS. 11A and 11B are block diagrams illustrating the configuration of a receiving device according to an embodiment of the disclosure.
Figure 11B:
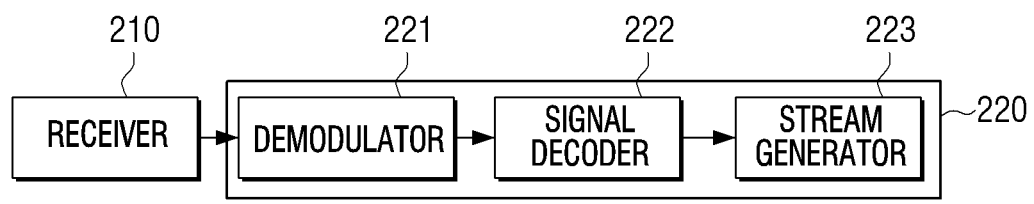

FIGS. 11A and 11B are block diagrams illustrating the configuration of a receiving device according to an embodiment of the disclosure.

Referring to FIG. 11A, the receiving device 200 includes a receiver 210 and a signal processor 220.

The receiving device 200 may be implemented to receive data from the transmitting device that maps data included in an input stream to at least one signal processing route and transmits data.

The receiver 210 receives a frame that includes data mapped to at least one signal processing route. Specifically, the receiver 210 may receive signaling information and a stream including data mapped to at least one signal processing route. Here, the signaling information may include information on the input type of the input stream input into the transmitting device and information on the data type mapped to at least one signal processing route. Here, information on the input type of the input stream may indicate whether all signal processing routes in a frame are of the same input type. Other than this, detailed information included in signaling information has been described above, and thus detailed explanation will be omitted.

The signal processor 220 extracts signaling information from a received frame. In particular, the signal processor 220 may extract L1 signaling, and decode it, and thereby acquire various information on PLPs included in an L1 free signaling area and an L1 post signaling area. Also, the signal processor 220 may perform signal processing on a frame based on the extracted signaling information. For example, signal processing may perform processes of demodulation, frame de-builder, BICM decoding, and input de-processing.

Specifically, the signal processor 220 performs signal processing on a transmission frame received at the receiver 210 and generates a baseband packet, and extracts header information from an ALP packet (a baseband packet) included in the generated baseband packet.

Then, the signal processor 220 may perform signal processing on payload data included in an input packet based on the extracted header information and restore a stream, i.e., an input stream that was initially input into the aforementioned transmitting device 100. Here, the extracted header information includes a field indicating the type of payload data and a field indicating whether the input packet transmits a complete input packet.

FIG. 11B is a block diagram for illustrating in detail a signal processor according to an embodiment of the disclosure.

According to FIG. 11B, the signal processor 220 includes a demodulator 221, a decoder 222, and a stream generator 223.

The demodulator 221 performs demodulation according to an OFDM parameter from a received RF signal, and performs sink detection, and when sink is detected, the demodulator 221 recognizes whether a frame that is currently received from signaling information stored in a sink area is a frame including necessary service data. For example, the demodulator 221 may recognize whether a mobile frame is received, or a fixed frame is received.

In this case, if OFDM parameters for the signaling area and the data area are not determined in advance, the demodulator 221 may acquire OFDM parameters for the signaling area and the data area stored in the sink area and acquire information on OFDM parameters for the signaling area and the data area that come right next to the sink area, and perform demodulation.

The decoder 222 performs decoding for necessary data. In this case, the decoder 222 may acquire parameters such as an FEC method, a modulation method, etc. for data stored in each data area by using signaling information and perform decoding. Also, the decoder 222 may calculate the location of necessary data based on data information included in the header. That is, the decoder 222 may calculate from which location of a frame the necessary PLPs are transmitted.

The stream generator 223 may process a baseband packet input from the decoder 222 and generate data to be serviced.

As an example, the stream generator 223 may generate an ALP packet from a baseband packet of which error has been corrected based on various information. Specifically, the stream generator 223 may include de jitter buffers, and the de jitter buffers may regenerate correct timing for restoring an output stream based on various information. Accordingly, delay for sink among a plurality of PLPs can be compensated.

Meanwhile, according to a transmitting method of a transmitting device according to an embodiment of the disclosure, a packet including a header and a payload may be generated on the basis of an input packet, and a frame including the generated packet may be generated. Afterwards, a signal generated on the basis of the frame may be transmitted.

In this case, in the step of generating a packet, padding may be inserted into at least one packet among a plurality of packets included in the frame on the basis of the number of packets included in the frame, the length of each input packet included in the frame, and the lengths of the packets.

Meanwhile, the boundary of the input packet may be included in the packet into which padding is inserted.

Also, in the step of generating a packet, a plurality of input packets may be allotted to the plurality of packets such that the boundary of the last input packet among the input packets included in the packet is included in the packet, and padding may be inserted into the remaining part of the at least one packet.

In addition, in the step of generating a packet, the length of padding to be inserted into the frame may be acquired, and if the remaining part after allotting at least one input packet to the packet is smaller than or equal to the acquired length of padding, padding may be inserted into the packet.

Further, in the step of generating a packet, a first value which is the result of multiplying the number of the packets to be transmitted from the frame with the lengths of the packets may be acquired, and a second value which is the result of adding the sum of the header lengths of the packets and the lengths of the input packets to be transmitted from the frame may be acquired, and the second value may be subtracted from the first value and the length of padding to be inserted into the frame may be acquired.

Also, the transmitting device may include a buffer storing a plurality of input packets to be transmitted from a frame. In this case, in the step of generating a packet, a plurality of input packets may be allotted to the plurality of packets included in the frame on the basis of the number of bits to be transmitted from the frame, the number of the plurality of input packets, the lengths of the plurality of input packets, and the lengths of the packets included in the frame, and padding may be inserted into the remaining part of at least one of the plurality of packets.

In addition, in the step of generating a packet, the amount of padding to be inserted into the packet may be calculated on the basis of the length of the header that varies according to insertion of the padding.

As an example, the header may include a field including a value indicating the length of the padding. In this case, in the step of generating a packet, the amount of padding to be inserted into the packet may be calculated on the basis of the length of the field according to insertion of the padding.

As another example, the header may include a field including a pointer value, and the pointer value indicates the offset from the starting location of the payload to the first starting location among at least one input packet starting from the payload. In this case, in the step of generating a packet, the amount of padding to be inserted into the packet may be calculated on the basis of the length of the field according to insertion of the padding.

Meanwhile, the packet may include a packet for a first RF channel and a packet for a second RF channel.

In this case, in the step of generating a packet, the plurality of input packets may be allotted to each of the boundaries of the packets for the first and second RF channels such that the boundaries of the plurality of input packets are included in the boundaries of the packets for the first and second RF channels, and padding may be inserted into the remaining parts of the packets for the first and second RF channels.

According to the disclosure as described above, cases wherein one input packet is dispersed in different packets are minimized as far as possible, and accordingly, the number of input packets influenced by errors of packets can be minimized. Also, as padding of the same length as in the conventional technology is inserted, transmission efficiency can be maintained.

Meanwhile, methods according to the aforementioned various embodiments of the disclosure may be implemented in forms of applications that can be installed on at least one of a transmitting device or a receiving device.

Also, methods according to the aforementioned various embodiments of the disclosure can be implemented just by software upgrade, or hardware upgrade of at least one of a conventional transmitting device or a conventional receiving device.

Further, the aforementioned various embodiments of the disclosure can be performed through an embedded server provided on at least one of a transmitting device or a receiving device, or through an external server of at least one of a transmitting device or a receiving device.

Meanwhile, the various embodiments described above may be implemented in a recording medium that can be read by a computer or an apparatus similar to a computer, by using software, hardware, or a combination thereof. In some cases, the embodiments described in this specification may be implemented as the processor 110, 210 itself. According to implementation by software, the embodiments such as processes and functions described in this specification may be implemented as separate software modules. Each of the software modules can perform one or more functions and operations described in this specification.

Meanwhile, computer instructions for performing the processing operations of the transmitting device 100 according to the aforementioned various embodiments of the disclosure may be stored in a non-transitory computer-readable medium. Computer instructions stored in such a non-transitory computer-readable medium make the processing operations at the transmitting device 100 according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

While preferred embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims. Also, such modifications are not to be interpreted independently from the technical idea or prospect of the disclosure.

What is claimed is:

1. A transmitting device comprising:
   a processor generating a packet including a header and a payload based on an input packet, and generating a frame including the generated packet; and
   a transmitter transmitting a signal generated based on the frame,
   wherein the processor is configured to:
      insert padding into at least one packet among a plurality of packets included in the frame based on a number of packets included in the frame, a length of each input packet included in the frame, and lengths of the packets, and
      calculate an amount of padding to be inserted into a physical layer packet based on the length of the header that varies according to insertion of the padding, and
   wherein a boundary of the input packet is included in the packet into which padding is inserted.

2. The transmitting device of claim 1, wherein the processor is further configured to:
   allot a plurality of input packets to the plurality of packets such that the boundary of the last input packet among the input packets included in the packet is included in the packet, and
   insert the padding into the remaining part of the at least one packet.

3. The transmitting device of claim 1, wherein the processor is further configured to:
   acquire the length of padding to be inserted into the frame, and
   based on the remaining part after allotting at least one input packet to the packet being smaller than or equal to the acquired length of padding, insert padding into the packet.

4. The transmitting device of claim 3, wherein the processor is further configured to:
   acquire a first value which is a result of multiplying the number of the packets to be transmitted from the frame with the lengths of the packets,
   acquire a second value which is the result of adding a sum of the length of the header of the packets and the lengths of the input packets to be transmitted from the frame, and
   subtract the second value from the first value and acquire the length of padding to be inserted into the frame.

5. The transmitting device of claim 1, further comprising:
   a buffer storing a plurality of input packets to be transmitted from the frame,
   wherein the processor is further configured to:
      allot the plurality of input packets to the plurality of packets included in the frame based on a number of bits to be transmitted from the frame, the number of the plurality of input packets, the lengths of the plurality of input packets, and the lengths of the packets included in the frame, and
      insert padding into the remaining part of at least one of the plurality of packets.

6. The transmitting device of claim 1,
   wherein the header of the packet includes a field including a value indicating the length of the padding, and
   wherein the processor is further configured to:
      calculate the amount of padding to be inserted into the packet based on a length of the field according to insertion of the padding.

7. The transmitting device of claim 1,
   wherein the header of the packet includes a field including a pointer value,
   wherein the pointer value is an offset from a starting location of the payload to a first starting location among at least one input packet starting from the payload, and
   wherein the processor is further configured to:
      calculate the amount of padding to be inserted into the packet based on a length of the field according to insertion of the padding.

8. The transmitting device of claim 1,
   wherein the packet includes a packet for a first RF channel and a packet for a second RF channel, and
   wherein the processor is further configured to:
      allot a plurality of input packets to each of the boundaries of the packets for the first and second RF channels such that the boundaries of the plurality of input packets are included in the boundaries of the packets for the first and second RF channels, and
      insert padding into the remaining parts of the packets for the first and second RF channels.

9. A transmitting method of a transmitting device, the method comprising:
   generating a packet including a header and a payload based on an input packet;
   generating a frame including the generated packet; and
   transmitting a signal generated based on the frame,
   wherein the generating a packet comprises:
      inserting padding into at least one packet among a plurality of packets included in the frame based on a number of packets included in the frame, a length of each input packet included in the frame, and lengths of the packets, and
      calculating an amount of padding to be inserted into the packet based on a length of the header that varies according to insertion of the padding, and
   wherein a boundary of the input packet is included in the packet into which padding is inserted.

10. The transmitting method of claim 9, wherein the generating of the packet comprises:
    allotting a plurality of input packets to the plurality of packets such that the boundary of the last input packet among the input packets included in the packet is included in the packet, and
    inserting the padding into the remaining part of the at least one packet.

11. The transmitting method of claim 10, wherein the generating of the packet further comprises:
    acquiring the length of padding to be inserted into the frame; and based on the remaining part after allotting at least one input packet to the packet being smaller than or equal to the acquired length of padding, inserting padding into the packet.

12. The transmitting method of claim 11, wherein the generating of the packet further comprises:
   acquiring a first value which is a result of multiplying the number of the packets to be transmitted from the frame with the lengths of the packets;
   acquiring a second value which is the result of adding a sum of the length of the header of the packets and the lengths of the input packets to be transmitted from the frame; and
   subtracting the second value from the first value and acquiring the length of padding to be inserted into the frame.

13. The transmitting method of claim 9,
   wherein the transmitting device includes a buffer storing a plurality of input packets to be transmitted from the frame, and
   wherein the generating of the packet comprises:
      allotting the plurality of input packets to the plurality of packets included in the frame based on a number of bits to be transmitted from the frame, the number of the plurality of input packets, the lengths of the plurality of input packets, and the lengths of the packets included in the frame, and
      inserting padding into the remaining part of at least one of the plurality of packets.

\* \* \* \* \*